Oct. 20, 1936.  J. H. HOWARD ET AL  2,058,156
CORE DRILL HEAD
Filed Feb. 4, 1935  2 Sheets-Sheet 1
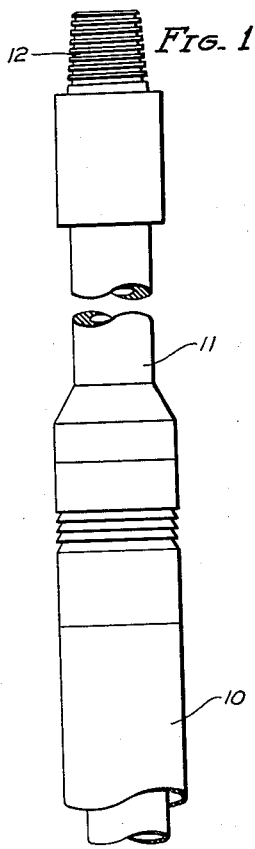
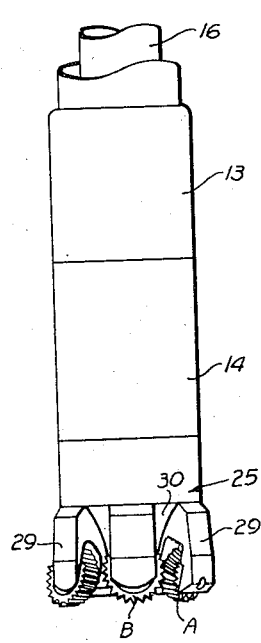
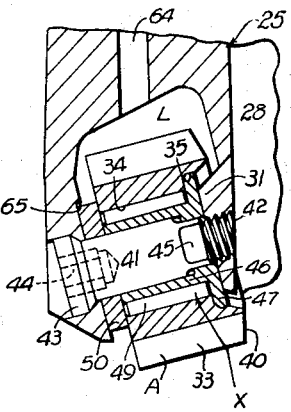
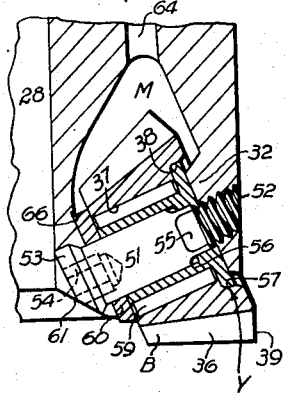
INVENTORS
JOHN H. HOWARD
ALFRED C. CATLAND
PER  *[signature]*
ATTORNEY Oct. 20, 1936.     J. H. HOWARD ET AL     2,058,156
CORE DRILL HEAD
Filed Feb. 4, 1935     2 Sheets-Sheet 2
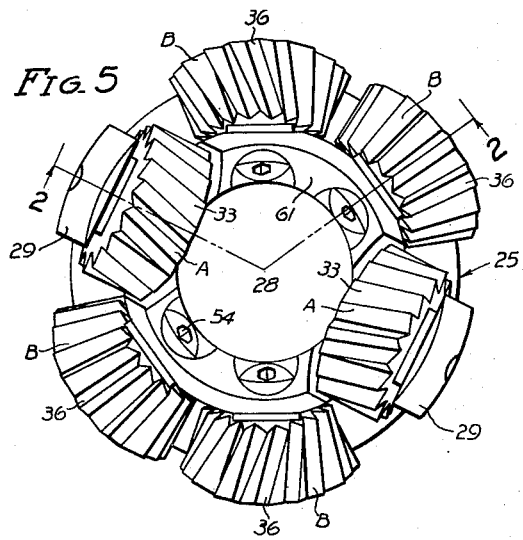
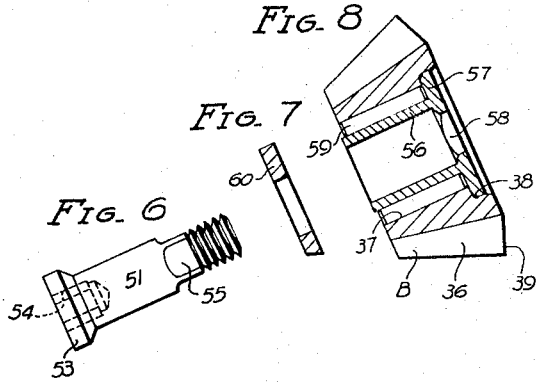
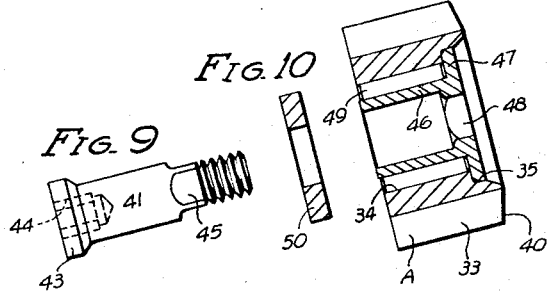
INVENTORS
JOHN H. HOWARD
ALFRED C. CATLAND
PER
ATTORNEY Patented Oct. 20, 1936

2,058,156

UNITED STATES PATENT OFFICE 2,058,156

CORE DRILL HEAD

John H. Howard, Huntington Park, and Alfred C. Catland, Alhambra, Calif.; said Catland assignor to Globe Oil Tools Company, Los Nietos, Calif., a corporation of California Application February 4, 1935, Serial No. 4,846

7 Claims. (Cl. 255—72)

This invention relates to well drilling tools and relates more particularly to core drills. A general object of the invention is to provide a practical improved and particularly effective bit head or cutter head for a core drill.

Another object of the invention is to provide a practical, dependable means for rotatably mounting cutters in the head of a core drill.

Another object of the invention is to provide a core drill head including means for rotatably mounting the cutters, which means comprise bearings for the cutters, bearing pins and novel non-rotatable bushings on the pins carrying the bearings and cutters whereby the pins may be of maximum toughness and strength.

Another object of the invention is to provide a core drill head embodying means for rotatably supporting the cutters in pockets or recesses of the head which means rigidly and securely connect or tie together the walls at the opposite sides of the recesses providing a structure of great strength.

Another object of the invention is to provide a core drill head having a plurality of rotatable cutters positioned to cut or form a core of maximum diameter, said head having walls of sufficient thickness and extent to dependably carry the cutters and their mountings.

Another object of the invention is to provide means for rotatably supporting or mounting the cutters of a well drill, said means including readily replaceable hardened wear taking bushings and thrust washers which protect the cutter carrying pins and the adjacent parts of the head against wear.

A further object of the invention is to provide a cutter head of the character mentioned in which the parts of the cutter carrying means are dependably and securely retained in position without employing welding whereby the cutters and parts of the mountings may be easily and quickly removed for replacement, etc.

The various objects and features of our invention may be fully understood from the following detailed description of a typical preferred form and application of our invention, throughout which description reference is made to the accompanying drawings, in which:

Fig. 1 is a side elevation of a core drill embodying the head provided by this invention. Fig. 2 is an enlarged longitudinal detailed sectional view of the lower portion of the drill and the head operating in a well bore, being a view taken as indicated by line 2—2 on Fig. 5. Fig. 3 is an enlarged fragmentary vertical detailed sectional view of a portion of the head illustrating one of the inner cutters and its mounting. Fig. 4 is a view similar to Fig. 3 illustrating one of the outer cutters and its mounting. Fig. 5 is a bottom elevation of the drill. Fig. 6 is a side elevvation of a pin for carrying an outer cutter. Fig. 7 is a sectional view of a thrust washer embodied in one of the mountings of the outer cutters. Fig. 8 is a longitudinal detailed sectional view of the assembly of an outer cutter and its bearing and bushing. Fig. 9 is a side elevation of a pin for carrying an inner cutter. Fig. 10 is a sectional view of a thrust washer embodied in the means for mounting an inner cutter and Fig. 11 is a longitudinal detailed sectional view of the assembly of an inner cutter and its bearing and bushing.

The cutter head of the present invention may be employed on core drills varying considerably in character. In the following detailed disclosure we will describe a typical embodiment of the invention employed on the core drill illustrated in the drawings, it being understood that the invention is not to be construed as restricted to the particular embodiment or application about to be described.

The core drill illustrated in the drawings includes an outer barrel 10 provided at its upper end with a lifter sub 11. A threaded pin 12 is provided on the upper end of the sub 11 for connecting the core drill with a drill collar or other part of the drilling string. A lower barrel sub 13 is provided on the lower end of the outer barrel 10 and carries a bit head sub 14. A threaded pin 15 is provided on the sub 14 for receiving or carrying the cutter head. An inner barrel 16 extends longitudinally through the outer barrel 10 to receive the core. In the drill illustrated the lower end of the inner barrel 16 is threaded into the opening 17 of the sub 14. The inner barrel 16 is spaced from the interior of the outer barrel 10 leaving an annular fluid passage 18. Longitudinal ports 19 are provided in the wall of the sub 14 for carrying circulation fluid from the passage 18 to the bit head.

A core catcher is provided in the opening 17 for retaining the core. The particular core catcher illustrated includes an annular body 20 shiftable longitudinally in the opening 17 and flexible members 21 projecting longitudinally from the opposite ends of the body 20. Slips 22 are provided on the lower ends of the flexible members 21 while the upper ends of the members 21 are inclined inwardly to cooperate with the core C. The lower portion of the opening 17 has an inclined wall which actuates the slips 22 inwardly to grip the core C when the drill is raised following the coring operation. The lower end of the inner barrel 16 operates to limit the upward movement of the core catcher body 20 in the opening 17.

The bit head or cutter head provided by this invention includes, generally, a shoe or body 25, sets of cutters A and B, and means X and Y for rotatably mounting or supporting the cutters A and B in the body 25.

The shoe or body 25 of the head is an annular or tubular member adapted to be applied to the lower end of the core drill. In the particular application of the invention illustrated in the drawings the body 25 has a threaded socket 26 in its upper end and the pin 15 of the sub is threaded in the socket to secure the body 25 to the drill. The body 25 may have a flat normal upper end to bear against a shoulder 27 at the base or upper end of the pin 15. The longitudinal opening 28 of the body 25 is round and concentric to the longitudinal axis of the drill to receive the core C. The exterior or peripheral surface of the body 25 is substantially cylindrical and is flush with the periphery of sub 14. A plurality of circumferentially spaced ribs or wings 29 is provided on the lower end portion of the body 25. The wings 29 extend longitudinally and the spaces between them constitute passages 30 for the upflow of fluid around the head.

Sockets or recesses L and M are provided in the lower end of the body 25 to hold or receive the cutters A and B. The pockets or recesses L and M are spaced circumferentially and are located so that the wings 29 constitute the portions of the body 25 defining their outer walls. The recesses L which carry the inner cutters A have their inner and outer walls inclined downwardly and inwardly with respect to the longitudinal axis of the drill. The upper walls of the recesses L may incline downwardly and outwardly. Bosses 31 are provided on the inner walls of the recesses L. The pockets or recesses M hold or carry the outer cutters B and their inner and outer walls are inclined downwardly and outwardly with respect to the longitudinal axis of the drill. The upper walls of the recesses M may incline downwardly and inwardly. Bosses 32 are provided on the outer walls of the recesses M. The number and the relative locations of the recesses L and M depends upon the desired arrangement of the cutters. In the case illustrated in the drawings there are two substantially diametrically opposite recesses L and two sets or pairs of recesses M spaced between the recesses L. When the head or body 25 is formed in this manner it carries two diametrically opposite inner cutters A and two sets or pairs of outer cutters B. An annular groove 63 is provided in the upper end of the body 25 to communicate with the lower ends of the ports 19. Openings or fluid passages 64 extend longitudinally through the wall of the body 25 from the groove 63 to the recesses L and M to discharge the circulation fluid downwardly against the cutters A and B.

The inner cutters A are in the nature of roller cutters and are substantially cylindrical in their general configuration. Peripheral cutting parts or teeth 33 are provided on the cutters A. The cutting teeth 33 may be spiralled and may extend between the opposite ends of the cutters. The inner ends or corners 40 of the teeth 33 are cut away or bevelled to trim the core C as will be hereinafter described. Each cutter A has a central longitudinal opening 34 provided at its inner end with an enlargement or socket 35. The outer cutters B are frusto-conical having normal opposite ends and tapered or inclined peripheries. Longitudinally extending cutting parts or teeth 36 are provided on the cutters B. The cutters B have central longitudinal openings 37 provided at their outer ends with enlargements or sockets 38. The outer ends or corners of the cutting teeth 36 are inclined or bevelled as shown at 39. The cutting teeth of the cutters A and B may be related in various manners. In the case illustrated one cutter A has teeth 33 pitched in a right hand direction and the other cutter A has teeth pitched in a left hand direction and each pair of cutters B has a cutter with axial teeth 36 and a cutter with spiralled teeth 36, the teeth 36 of the last mentioned cutters B being pitched in opposite directions.

The means X and Y for rotatably carrying or supporting the cutters A and B are features of the invention. The means X includes a pin 41 extending through each recess L to carry or support a cutter A. Openings 42 extend through the body 25 to intersect the recesses L. The openings 42 are inclined downwardly and outwardly relative to the longitudinal axis of the head having longitudinal axes which are substantially normal to the inner and outer walls of the recesses L. The openings 42 enter the body 25 at the outer sides of the wings 29 and may continue through the inner wall of the head to the opening 28. The inner end portions of the pins 41 are threaded in the openings 42. Heads 43 are provided on the outer ends of the pins 41 and are received in the outer end portions of the openings 42. Polygonal sockets 44 may be provided in the heads 43 for receiving a wrench for turning or threading the pins. The bodies or major portions of the pins 41 are cylindrical as illustrated in the drawings. In accordance with the invention the pins 41 have polygonal portions at the inner ends of their threads presenting flat surfaces 45.

The cutter mounting or supporting means X includes bushings 46 on the pins 41. The bushings 46 are removable or replaceable and are preferably hardened or of hard material to be long wearing. The removable bushings 46 are tubular and surround the major portions of the pins 41 to present cylindrical external bearing surfaces. Annular flanges 47 are provided on the inner ends of the bushings 46 and are received in the sockets 35 of the cutters A. The outer surfaces of the flanges 47 bear against the bosses 31 to transmit inward thrusts to the body 25. The openings of the bushings 46 where they pass through the flanges 47 are polygonal having flat walls 48 which cooperate with the flat surfaces 45 of the pins 41 to positively hold the bushings against turning on the pins. The bushings 46 in being held against rotation protect the pins 41 against wear. In the preferred form of the invention the bushings 46 carry bearings. As illustrated in the drawings the bearings comprise series of rollers 49 inserted or interposed between the bushings 46 and the walls of the cutter openings 34. Thrust washers 50 surround the pins 41 and bear against the outer walls of the recesses L to receive end thrusts from the cutters A and the bushings 46. The washers 50 are flat sided to have non-rotative engagement with the shoulders 65.

When mounting or arranging the cutters A on the body 25 of the head the bushings 46 and the bearings 49 are first assembled in the cutters. The cutters are then passed or inserted in the recesses L to their proper positions where the flanges 47 engage the end surfaces of the bosses 31. The thrust washers 50 are arranged in place and the pins 41 are passed into the openings 42 and screwed in position. In accordance with the invention the threads of the pins 41 and the openings 42 are left hand threads so that the turning forces that may be transmitted to the pins due to rotation of the cutters A during operation tend to tighten the pins in the openings 42.

The means Y for rotatably mounting or supporting the outer cutters B includes pins 51 extending through the pockets or recesses M. Openings 52 intersect the recesses M to carry the opposite end portions of the pins 51. The openings 52 are inclined downwardly and inwardly having their longitudinal axes substantially normal to the inner and outer walls of the recesses M. The pins 51 are passed into the openings 52 from their inner ends and the outer end portions of the pins are threaded in the openings. Heads 53 are provided on the inner ends of the pins 51 and are received in the inner end portions of the openings 52. Polygonal sockets 54 are provided in the heads 53 for receiving a wrench for turning or threading the pins. The bodies or major portions of the pins 51 are cylindrical. Each pin 51 has a polygonal portion at the inner end of its thread presenting a plurality of flat faces 55.

The cutter mounting or supporting means Y includes bushings 56 on the pins 51. The bushings 56 are tubular members surrounding the bodies of the pins 51 and presenting cylindrical bearing surfaces. The replaceable bushings 56 are preferably hardened or formed of hard material. Annular projecting flanges 57 are provided on the outer ends of the bushings 56 and are received in the sockets 38 of the cutters B. The flanges 57 are adapted to bear on the bosses 32 to transmit end thrusts to the body 25. The portions of the openings in the bushings 56 which extend through the flanges 57 are polygonal having flat walls 58 which cooperate with the flat faces 55 of the pins 51 to hold the bushings against rotation on the pins. Roller bearings 59 are preferably interposed between the walls of the cutter openings 37 and the bushings 56. Thrust washers 60 are arranged on the pins 51 to bear against the inner walls of the recesses M. The washers 60 are preferably flat sided to be held against rotation by engaging shoulders 66.

In mounting the outer cutters B the bushings 56 and the bearings 59 are first assembled in the cutters and these assemblies are then arranged in the recesses M so that the flanges 57 bear on the bosses 32. The thrust washers 60 are arranged in place and the screws or pins 51 passed into the openings 52. The pins 51 may be tightly threaded in place. The threads of the pins 51 and the openings 52 are preferably left hand threads so that turning forces put on the pins due to rotation of the cutters B tend to tighten the pins in the openings 52. Following the threading of the pins 51 in the openings 52 the heads 53 may be faced off to be flush with the inclined surface 61 at the mouth of the opening 28.

The inner cutters A project downwardly from the lower end of the body 25 to engage the formation at the bottom of the well bore and project into the lower portion of the opening 28 to trim or form the core C. The inner cutters A are rotatable about downwardly and outwardly inclined axes so that their cutting teeth 33 are pitched or inclined where they cooperate with the earth formation. The bevelled corners 40 of the cutting teeth 33 are substantially vertical or parallel with the axis of the drill as they engage the formation to trim the core C. The bevelled ends 40 of the cutting parts are adapted to trim the core to pass into the opening 28 with proper clearance. The outer cutters B project from the lower end of the body 25 to act on the formation at the bottom of the well bore. The outer cutters B project outwardly beyond the wings 29 so that the outer ends or corners 39 of their cutting teeth 36 act on the formation at the side wall of the well bore to cut the bore to size. Due to the downward and inward inclination of the axis of rotation of the cutters B the cutting parts 36 are substantialy horizontal as they come into active engagement with the formation at the bottom of the well bore. The groups or sets of cutters A and B overlap one another in their action on the formation and are rapid and efficient in their cutting action.

The cutter mounting or supporting means X and Y of the invention dependably support the cutters A and B for free rotation about their own axes. The pins 41 and 51 securely connect or tie together the wall portions of the body 25 at the opposite sides of the recesses L and M to materially strengthen or reinforce the head structure. The pins 41 and 51 may be formed of strong, tough steel to dependably carry the cutters while the bushings 46 may be of hard material to take the wear caused by rotation of the cutters. In the structure provided by this invention the pins 41 and 51 are inserted from the lower ends of the openings 42 and 52 whereby the walls of the head 25 may be of maximum thickness without reducing the size of the core receiving opening 28. It is to be noted that the walls of the body 25 are sufficiently heavy and thick at all points to have the required strength for carrying the cutters and their mounting assemblies. The cutters A and B and the various parts of their supporting assemblies may be easily and quickly replaced.

Having described only a typical form and application of our invention, we do not wish to be limited or restricted to the specific form and application herein set forth, but wish to reserve to ourselves any modifications or variations that may appear to those skilled in the art or fall within the scope of the following claims.

Having described our invention, we claim:

1. In a well drilling tool, a body having a recess in its lower end and an opening intersecting the recess, the opening having its axis inclined downwardly and inwardly relative to the longitudinal axis of the tool, a cutter, and means for supporting the cutter in the recess including a pin inserted in the opening from its lower inner end and threaded in the opening at the outer side of the recess, and a head on the inner end of the pin cooperating with the body whereby the pin securely ties together the portions of the head at the opposite sides of the recess.

2. In a well drilling tool, a body having a recess in its lower end and an opening intersecting the recess, the opening having its axis inclined downwardly and inwardly relative to the longitudinal axis of the tool, a cutter, and means for supporting the cutter in the recess including a pin inserted in the opening from its lower inner end and threaded in the opening at the outer side of the recess, a head on the inner end of the pin cooperating with the body whereby the pin securely ties together the portions of the head at the opposite sides of the recess, and a non-rotatable bushing on the pin.

3. A head for a core drill including an annular body having a recess in its lower end and an opening intersecting the recess, the longitudinal axis of the opening being inclined downwardly and inwardly relative to the longitudinal axis of the drill, a cutter, and means for rotatably supporting the cutter in the recess including a pin inserted in the lower inner end of the opening and threaded in the opening at the outer side of the recess, a head on the inner end of the pin for engaging the body whereby tightening of the pin securely ties together the portions of the head at the opposite sides of the recess, and a non-rotatable bushing on the pin.

4. A head for a core drill including an annular body having a recess in its lower end and an inclined opening intersecting the recess, a cutter having an opening and a socket at an end of the opening, and means for rotatably supporting the cutter in the recess including a pin carried in the opening in the body and passing through the opening in the cutter, the pin having a substantially flat surface, a bushing on the pin having a substantially flat surface cooperating with the surface of the pin, and a flange on the bushing received in said socket and bearing on a wall of the recess.

5. A head for a core drill including an annular body having a recess in its lower end and an inclined opening intersecting the recess, a boss on a wall of the recess, a cutter having an opening and a socket at an end of the opening, and means for rotatably supporting the cutter in the recess including a pin carried in the opening in the body and passing through the opening in the cutter, a bushing on the pin, means holding the bushing against rotation, and a flange on the bushing received in the socket and bearing on the boss.

6. A head for a core drill including an annular body having a recess in its lower end and an inclined opening intersecting the recess, a boss on a wall of the recess, a cutter having an opening and a socket at an end of the opening, and means for rotatably supporting the cutter in the recess including a pin carried in the opening in the body and passing through the opening in the cutter, a bushing on the pin, a roller bearing on the bushing, means holding the bushing against rotation, and a flange on the bushing received in the socket and bearing on the boss.

7. A head for a core drill including, an annular body having circumferentially spaced recesses in its lower end, and having openings intersecting the recesses, some of the openings being inclined downwardly and outwardly and other openings being inclined downwardly and inwardly, bosses on the walls of the recesses, cutters each having an opening and a socket at an end of the opening, and means for rotatably supporting the cutters in the recesses including pins carried in the openings of the body and passing through the openings in the cutters, the pins having threaded engagement with the body to tie together the portions of the head at the opposite sides of the recesses, bushings on the pins, means holding the bushings against rotation, bearings on the bushings, and flanges on the bushings received in the sockets and bearing on the bosses.

JOHN H. HOWARD.
ALFRED C. CATLAND.